Patented Jan. 26, 1937

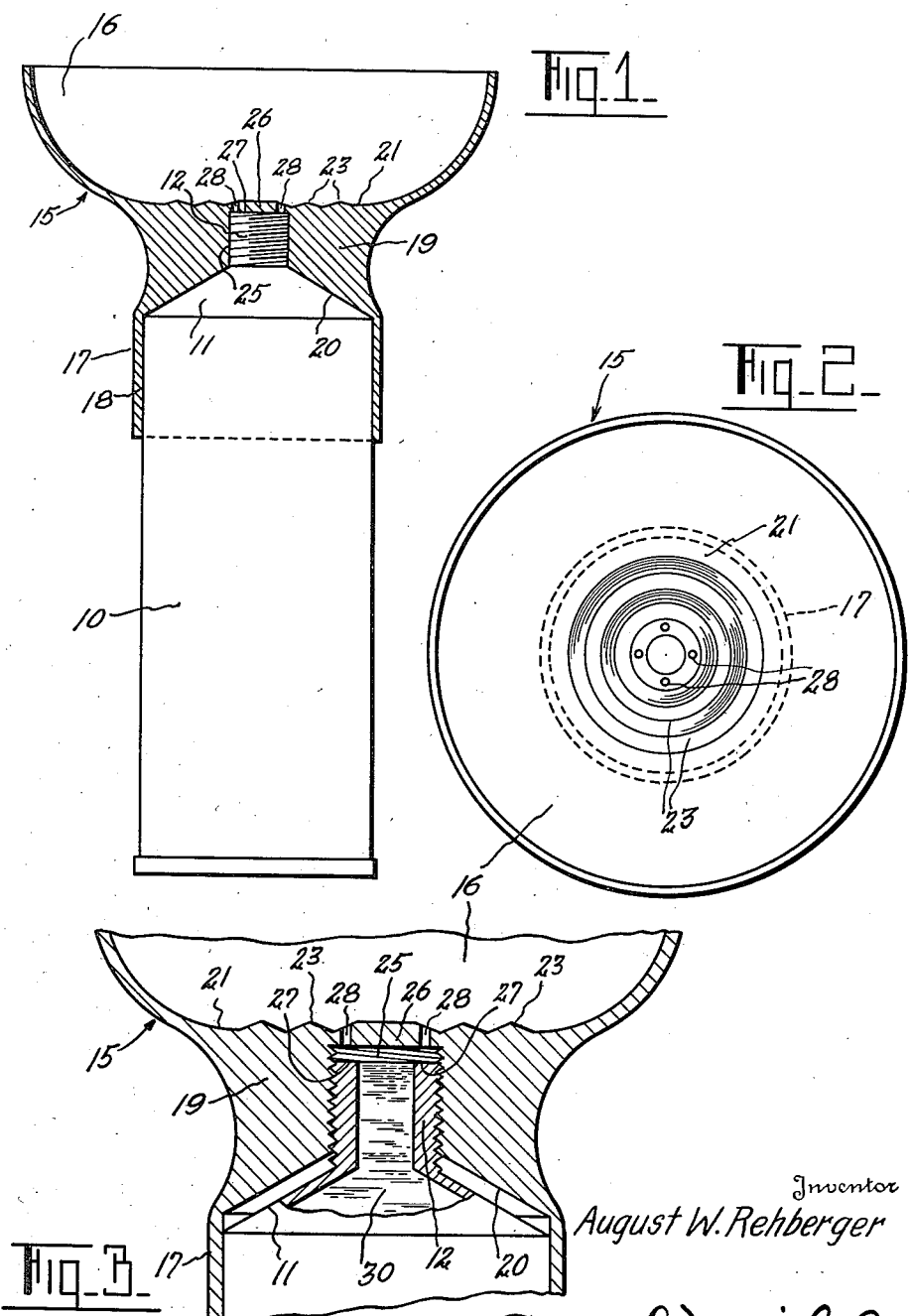

2,069,048

UNITED STATES PATENT OFFICE 2,069,048

LATHER BOWL

August W. Rehberger, Brooklyn, N. Y.

Application June 3, 1935, Serial No. 24,660

3 Claims. (Cl. 145—136)

This invention relates to shaving receptacles and more particularly to a lather bowl.

The principal object of the invention is to provide a cup-shaped lather bowl adapted to be secured to the threaded nipple on the end of a tube of shaving cream, and so constructed as to not only serve as a closure cap for the tube of shaving cream but also as a supporting stand therefore when not in use.

A further object of the invention is to incorporate in the lather bowl suitably arranged openings on the bottom thereof adapted to have forced therethrough a desired quantity of the shaving cream when the lather bowl is slightly unscrewed relative to the tube nipple, which openings are further adapted to be closed by the nipple itself after the desired quantity of shaving cream is provided in the lather bowl.

An additional object of the invention is to provide the bottom of the lather bowl with a roughened or corrugated surface which is designed to facilitate the ready lathering of the shaving cream.

Still further objects of the invention are to secure simplicity of construction and operation and to obtain other advantages and results as may be brought out in the following description with reference to the annexed drawing wherein:—

Figure 1 is an elevational view of the tube of shaving cream with the lather bowl shown in section;

Figure 2 is a plan view of the lather bowl; and

Figure 3 is a detail sectional view on an enlarged scale of the lather bowl and its connection to the tube of shaving cream.

Referring to the drawing, the reference numeral 10 denotes a standard collapsible tube of shaving cream which is more or less of uniform size and provided at its upper end with a cone-shaped shoulder 11, that terminates with the usual centrally disposed threaded nipple 12, adapted to have threaded thereon a conventional cap (not shown).

Arranged for attachment on the shoulder 11 of the tube 10 is a lather bowl or receptacle 15 that may be made of non-corroding metal, glass, plastic composition or any other suitable material. The lather bowl 15 comprises a cup-shaped portion or bowl 16 and a tube receiving portion 17, that is defined by a substantially cylindrical wall 18, and of a size to snugly receive the upper portion of the tube 10. The bowl 16 and tube-receiving portion 17 are co-axially arranged and separated by a neck or partition 19. The lower side of the partition 19 is provided with a conical surface 20 adapted to engage the conical shoulder 11 of the tube 10, while the upper side 21 of the partition 19 defines the bottom of the bowl 16. Formed on the bottom 21 of the bowl 16 are a plurality of concentrically arranged corrugations or ridges 23 for a purpose to be hereinafter described.

Axially formed in the partition 19 is a threaded opening 25 into which the nipple 12 of the tube 10 is threaded when said tube is attached to the lather-bowl 15, in the manner clearly shown. Referring to Figure 3 it will be seen that the opening 25 terminates short of the bottom 21 of the bowl 16 to define an end wall or bottom 26 that is adapted to be engaged by the end 27 of the nipple 12 when the same is screwed into the opening 25 to its full extent.

Formed in the wall 26 is a plurality of circularly arranged openings 28 so positioned in said wall as to register with the wall of the nipple 12, whereby when the same is screwed into engagement with the inner surface of the wall 26, said openings 28 will each be completely and positively closed by the terminal end 27 of the nipple 12, for a purpose to be hereinafter described. The openings 28 are each of a diameter less than the wall thickness of the nipple 12 and extend completely through the wall 26 thus communicating the interior of the threaded opening 25 with the bottom of the bowl 16.

In the attaching of the lather bowl 15 to the tube of shaving cream 10, the usual cap thereon is removed and the nipple 12 of the tube is screwed into the opening 25 to tightly engage the wall 26. In this position, the shoulder 11 will abut the seat 20 whereby the upper end portion of the tube will be firmly retained in the tube receiving portion 17. In this position the shaving cream 30 in the tube cannot be squeezed out of the tube as the opening in the nipple 12 is positively closed by the wall 26. When it is desired to use the lather bowl as a reservoir for lather, the tube 10 is given a slight turn to the left. This will cause the nipple 12 to be screwed slightly out of the opening 25 thus separating the end 27 thereof from the wall 26, as clearly shown in Figure 3. By then squeezing the tube 10, shaving cream 30 will be squeezed into the space of the opening 25 and forced out through the openings 28 into the bowl 16. After a sufficient quantity of shaving cream has been provided in the bowl 16, the tube 10 may then be turned to the right to screw the nipple 12 into engagement with the wall 26 to close the same again.

The shaving cream in the bowl 10 may then be worked into a lather by a wet shaving brush in the manner well known, this operation being facilitated by the corrugations 23 at the bottom of the bowl 16, which, by virtue of their undulating surface cooperate with the brush in quickly forming the shaving cream into a lather.

After use, the bowl 16 may be quickly cleaned by washing the same under a stream of water.

The tube 10 when not in use is supported by the lather bowl 15 by the simple expedient of inverting the same, the bowl 16 thus functioning as a stand for the tube in a manner readily apparent.

While the device as above described is preferably used in connection with shaving cream as a lather bowl, it will be understood that the same is not limited to such use or employment, as it may be used in conjunction with collapsible tubes containing various ingredients such as medicaments, tooth-paste, cleansing creams, polishing creams, pastes, etc., and for other uses and employments within the scope of the following claims.

Having thus set forth and disclosed the nature of this invention, what is claimed is:

1. A device of the character described comprising a bowl portion and a hollow handle portion adapted to receive the upper end of a collapsible tube, a threaded opening provided at the inner end of said hollow handle arranged axially with respect thereto and terminating short of the bottom of said bowl portion to define an end wall, said threaded opening receiving therein the threaded nipple of said collapsible tube, a plurality of passages formed in said end wall and so arranged as to be in registry with the terminal end of said nipple and adapted to be closed thereby simultaneously with the closing of the nipple by said end wall, said passages being of a diameter less than the wall thickness of said nipple and each communicating the interior of said threaded opening with the bottom of said bowl.

2. A device of the character described comprising a bowl, means extending beneath the bottom thereof adapted to have secured thereto the nipple of a collapsible tube, openings formed in the bottom of said bowl communicating said nipple with the interior of said bowl, said openings being adapted to be closed and opened by said nipple upon movement thereof relative to said bowl.

3. A device as characterized comprising a bowl portion, a hollow handle portion adapted to receive therein the nipple and upper portion of a collapsible tube, a solid partition arranged between and rigidly joining said portions and so formed as to provide a cone shaped seat for the upper end of said collapsible tube, a threaded opening axially formed in said partition adapted to threadedly receive the nipple of said collapsible tube and terminating short of the bottom of said bowl portion to define an end wall, and a plurality of passages formed in said end wall each communicating the interior of said threaded opening with the bottom of said bowl, the lower end of said passages being of a diameter less than the wall thickness of said nipple and in registry with the terminal end thereof and adapted to be simultaneously closed by said terminal end of said nipple when the same comes into abutting engagement with said end wall.

AUGUST W. REHBERGER.